United States Patent [19]
Kurata

[11] Patent Number: 6,014,737
[45] Date of Patent: Jan. 11, 2000

[54] METHOD AND SYSTEM FOR ALLOWING A PROCESSOR TO PERFORM READ BYPASSING WHILE AUTOMATICALLY MAINTAINING INPUT/OUTPUT DATA INTEGRITY

[75] Inventor: Takahiro Kurata, San Jose, Calif.

[73] Assignees: Sony Corporation of Japan, Tokyo, Japan; Sony Electronics, Inc., Park Ridge, N.J.

[21] Appl. No.: 08/974,072

[22] Filed: Nov. 19, 1997

[51] Int. Cl.[7] ........................................ G06F 9/38
[52] U.S. Cl. ............................. 712/219; 712/225
[58] Field of Search .................... 712/219, 225, 712/218; 711/138

[56] References Cited

U.S. PATENT DOCUMENTS

| | | | |
|---|---|---|---|
| 5,148,526 | 9/1992 | Nishimukai et al. | 710/52 |
| 5,471,598 | 11/1995 | Quattromani et al. | 712/218 |
| 5,615,350 | 3/1997 | Hesson et al. | 712/218 |
| 5,878,245 | 3/1999 | Johnson et al. | 711/154 |

*Primary Examiner*—Richard L. Ellis
*Attorney, Agent, or Firm*—Wagner Murabito & Hao LLP

[57] ABSTRACT

A method and system for automatically stalling a pipeline of a processor to insure input/output (I/O) data integrity, where the processor has a write buffer and allows read instructions to bypass write instructions. Within the processor, write instructions are stored in a write buffer and read instructions are allowed, in certain circumstances, to bypass these stored write instructions. The present invention utilizes the operating system (OS) of a computer system to collect, in the page frame number (PFN) information, an indication as to whether or not a particular memory range is located in I/O memory space. The I/O memory space is defined as memory space that is used to communicate information to and from a peripheral device. When a memory address is placed into a translation lookaside buffer (TLB) of the processor, it is stored with the above indication. If this memory address is associated with a write instruction that becomes stored in the write buffer, the indication is copied into the write buffer. Each time a read instruction is processed by the processor, a check is made to determine if the read instruction is within I/O memory space. If not, the read is allowed to bypass any write instructions in the write buffer. If so, a check is made if any write instructions of the write buffer also involve I/O memory space. If not, the read is allowed to bypass any write instructions in the write buffer. If so, the read instruction is not allowed to bypass, and a pipeline stall is invoked to clear the write buffer. Then, the read instruction can proceed.

22 Claims, 13 Drawing Sheets

METHOD AND SYSTEM FOR ALLOWING A PROCESSOR TO PERFORM READ BYPASSING WHILE AUTOMATICALLY MAINTAINING INPUT/OUTPUT DATA INTEGRITY

BACKGROUND OF THE INVENTION

1. Field of the Invention

The present invention relates to the field of processors within a computer system. More specifically, the present invention relates to the field of performance enhancements for processors that allow out-of-order execution of memory access instructions.

2. Related Art

Processors (e.g., microprocessors) of computer systems execute instructions that access information stored in memory units or peripheral devices of the computer system. A peripheral device is often called an input/output (I/O) device. A read instruction, also called a "load" instruction, causes the processor to request information from a memory unit or from a peripheral device. Conversely, a write instruction, also called a "store" instruction, causes the processor to write information out to a memory unit or to a peripheral device. Whether it be a memory unit or a peripheral device that is being accessed by the processor, a memory location is often used within the instruction to indicate the particular location of the source or the destination of the information. For instance, if a memory unit is being accessed, the memory location in the instruction typically corresponds to a cell of the memory unit. However, if a peripheral device is being accessed, the memory location in the instruction typically corresponds to a register located within the peripheral device. Within the computer system, memory locations that correspond to memory units are said to be within the "memory space" of the address space of the computer system and memory locations that correspond to peripheral devices are said to be located within the "I/O memory space" of the address space of the computer system.

A performance advantage is achieved when a read data instruction is not blocked by previous store data instructions. Once the store data is put into the write buffer, the following read data instruction can proceed as long as there is not data dependency between stored data and the loading data. As a result, the system bus shows out-of-order transactions and the bus activity does not follow the exact instruction flow. The instruction pipeline is blocked by the pending read but not the pending write. Flushing out the write buffer and moving the instruction pipeline can proceed concurrently. Thus, read instructions bypassing write instructions is a desirable feature to enhance the performance of a microprocessor.

FIG. 1A and FIG. 1B illustrate a read bypass where the instructions are not data dependent. An instruction stream 10 is fetched from memory and the instructions are coded in sequence such that instructions on the top (e.g., 10a) are fetched earlier than instructions on the bottom (e.g., 10n). Instruction stream 10 represents the "in-order" sequence of the instructions. If the instructions were processed in-order, read A instruction 10c would be processed before write C instruction 10d which would be processed before write X instruction 10e, etc. The processor places the write instructions (10d and 10e) into a write buffer 20 located within the processor thereby allowing read G instruction 10f to bypass these write instructions (10d and 10e) while the write instructions (10d and 10e) perform their relatively slow external memory access operation. The result is shown in FIG. 1B where the modified instruction stream 10' is processed by the pipeline 30 of the processor. As shown, read G instruction 10f is allowed to execute after read A instruction 10c thereby bypassing the earlier write instructions (10d and 10e) which are pending in the write buffer 20. This bypassing can occur only if the read instruction (read G 10f) does not need the same data as involved in the write instructions (10d and 10e) which are pending in the write buffer 20. Otherwise, the instructions are said to be "data dependent." Therefore, it is an effective performance enhancement feature that the read instruction bypass the write instruction while the write data is in the write buffer 20, as long as reading data does not have any data dependency.

FIG. 1C illustrates a condition whereby instructions are data dependent. An instruction stream 40 is shown having a write C instruction 40d that is stored in the write buffer 20. However, the subsequently fetched read C instruction 40f uses the same data involved in the write C instruction 40d. In this case, the read C instruction 40f is not allowed to bypass the write C instruction 40d so that data integrity is maintained. The read C instruction 40f can only execute after the contents of write buffer 20 are all processed. In this case, the instruction order as shown in instruction stream 40 is maintained by the processor.

In view of the above, it is important for the processor that performs read bypassing to have a mechanism for detecting data dependencies between a write instruction in the write buffer 20 and a subsequently fetched read instruction. For memory accesses within the "memory space" (e.g., instructions that access data of memory cells of memory units), the data is checked in the prior art by comparing the memory addresses of the read and write instructions. their addresses match, the instructions have a data dependency, so the read instruction is not allowed to bypass the pending write instruction(s). More specifically, in the prior art, the memory addresses of the write instructions pending within the write buffer are compared to the addresses of a subsequently fetched read instruction that is a bypass candidate. If an address match occurs, the read instruction is not allowed to bypass the pending write instruction(s).

Data dependencies with respect to memory accesses in the I/O memory space (e.g., read and write instructions to and from a peripheral device) cannot be detected by merely checking the memory addresses of the instructions. The memory locations associated with read and write instructions with respect to peripheral devices involve writing to and reading from registers within the peripheral device. Writing to some registers of a peripheral device can change the values of other registers within the same device or within other devices. That is to say, registers within a peripheral device can be data dependent without respect to their memory location. Therefore, merely checking memory location coincidence will not detect all data dependencies between instructions that read from and write to a peripheral device. What is needed is a read bypassing mechanism that does not merely compare addresses of read and write instructions to determine the absence of data dependencies between the instructions.

One prior art mechanism maintains data integrity with respect to read and write addresses of the I/O memory space. This solution provides a special instruction that is used by a programmer which causes the write buffer 20 to flush out all of its contents (e.g., process all pending write instructions stored in the write buffer 20) before a subsequently fetched read instruction is executed. Some processors refer to this special instruction as the "sync" or synchronizing instruction. With respect to the Power PC™ processor, this instruction is the "EIEIO" instruction. Basically, when this instruction is received, the read instruction is halted until each of the pending write instructions within the write buffer 20 are fully processed. Although this solution maintains data integrity, it requires extra processor cycles to execute the special instruction. These extra cycles reduce the performance gain that is desired when implementing read bypassing in the first place. What is needed is a system and method for responding to data dependencies within the I/O memory space that does not consume extra processor cycles to implement. Another disadvantage of the above solution is that read bypassing is effectively eliminated in all read and write instructions that involve the I/O memory space because the write buffer 20 is forced flushed. What is needed is a system and method for read bypassing that does not eliminate all read bypassing involving the I/O memory space.

Another disadvantage of the above solution is that the programmer is required to insert the special instruction which causes write buffer flushing and this method is subject to human error. Should the programmer forget to insert the special instruction, data integrity with respect to memory transactions within the I/O memory space can be severely compromised. This can lead to a system failure. What is needed is a system and method for read bypassing that responds to data dependencies within the I/O memory space and that is not dependent on a special user inserted instruction.

Accordingly, the present invention provides a read bypassing mechanism and method for a processor that does not merely compare addresses of read and write instructions to determine data dependencies. The present invention further provides a read bypass system that responds to data dependencies between instructions that access the I/O memory space and that does not consume extra processor cycles to implement. The present invention yet provides a system and method for read bypassing that does not eliminate all read bypassing for instructions that involve the I/O memory space. The present invention also provides a read bypass system that responds to data dependencies between instructions that access the I/O memory space and that is not dependent on a special user inserted instruction. These and other advantages of the present invention not specifically mentioned above will become clear within discussions of the present invention presented herein.

SUMMARY OF THE INVENTION

A method and system are described herein for automatically stalling a pipeline of a processor to insure input/output (I/O) data integrity where the processor has a write buffer and allows read instructions to bypass write instructions. Within the processor, write instructions are stored in a write buffer and read instructions are allowed, in certain circumstances, to bypass these stored write instructions. Within a computer system, the present invention utilizes the operating system (OS) to collect, in the page frame number (PFN) of the address page table, a coded attribute that indicates whether or not the memory location associated with the PFN is within the I/O memory space. The I/O memory space is defined as memory space that is used to communicate information to and from a peripheral device. When a memory location is placed into an entry of a translation lookaside buffer (TLB) of the processor, its associated coded attribute is also stored within the TLB. The TLB associates virtual memory addresses with physical memory addresses. If this memory location is associated with a write instruction that becomes stored in the write buffer, the coded attribute is also transferred into the write buffer. Therefore, the write buffer contains information indicating whether or not the write instruction targets I/O memory space.

Each time a read instruction is encountered by a bus interface unit of the processor, a check is made to determine if the address of the read instruction targets I/O memory space. If not, the read instruction is allowed to bypass any write instructions in the write buffer. If the read instruction targets I/O memory space, a check is made if any pending valid write instructions of the write buffer also target I/O memory space. If not, the read instruction is allowed to bypass any write instructions in the write buffer. If at least one pending valid write instruction in the write buffer targets I/O memory space, the read instruction is not allowed to bypass, and a pipeline stall is invoked while the write buffer is allowed to clear its pending write instructions that target I/O memory space. Then, the read instruction can proceed. By automatically stalling the pipeline of the processor, the present invention forces the memory access instructions to execute in-order, in certain circumstances, so that data integrity within the I/O memory space is maintained. By allowing the read instruction, in other circumstances, to bypass the write instructions, the present invention allows a performance advantage over systems that process all instructions in-order. The above is allowed without the requirement of a user inserted instruction.

More specifically, embodiments of the present invention include a computer system having a processor coupled to a bus, a memory coupled to the bus and an operating system, the processor having a circuit for detecting data dependencies between memory access instructions including: a translation lookaside buffer (TLB) circuit having entries storing virtual and physical addresses and attribute values indicating any physical addresses that map to an input/output (I/O) memory space; a data cache controller coupled to the TLB for storing write instructions into a write buffer circuit and for generating a first signal indicating a read instruction-that accesses the I/O memory space; the write buffer circuit having a plurality of entries each for storing an attribute value indicating if an associated write instruction accesses the I/O memory space, the write buffer circuit for generating a second signal if one write instruction stored therein accesses the I/O memory space; and a bus interface unit prohibiting the read instruction from bypassing a write instruction of the write buffer circuit when the first and second signals are asserted.

Embodiments of the present invention include the above and wherein the processor further comprises a pipeline unit and wherein the DCC circuit generates a stall signal when the first signal and the second signal are asserted, the stall signal for stalling the pipeline unit and wherein the operating system is for determining the attribute values of the entries of the TLB circuit.

DETAILED DESCRIPTION OF THE INVENTION

Figure 1A:
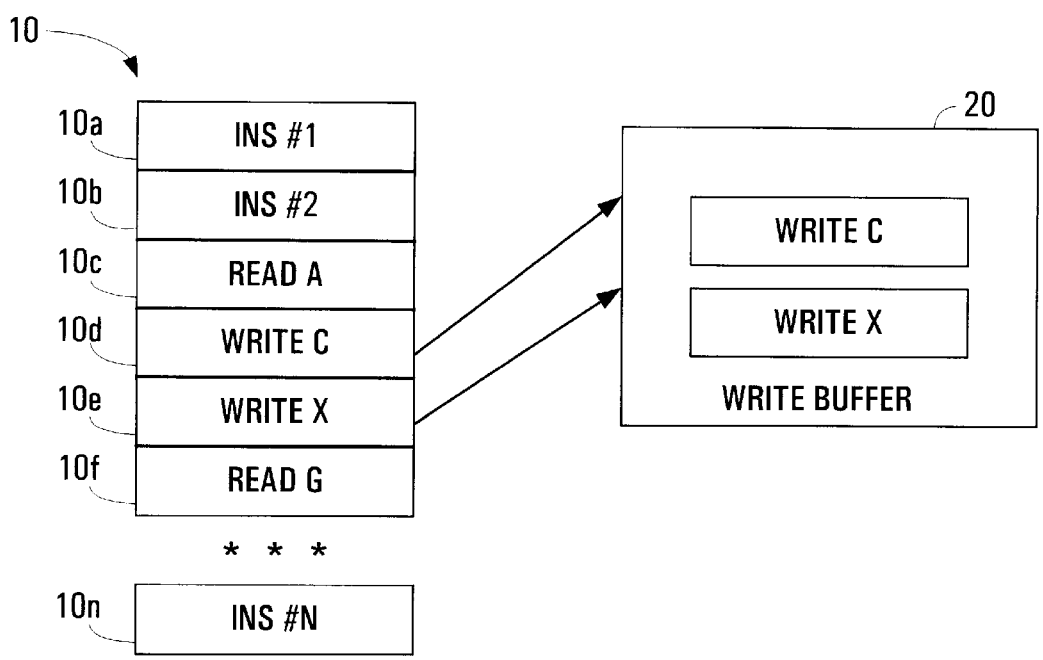
FIG. 1A and FIG. 1B illustrate a diagram of write instructions being stored in a write buffer and subsequently fetched read instructions allowed to bypass these write instructions where no data dependencies exist between the instructions.
Figure 1B:
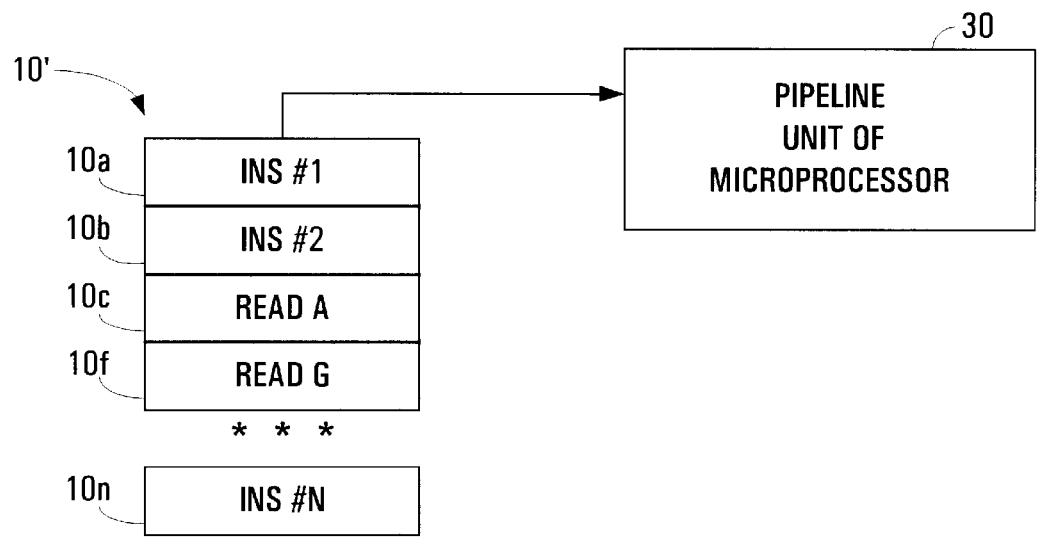
Figure 1C:
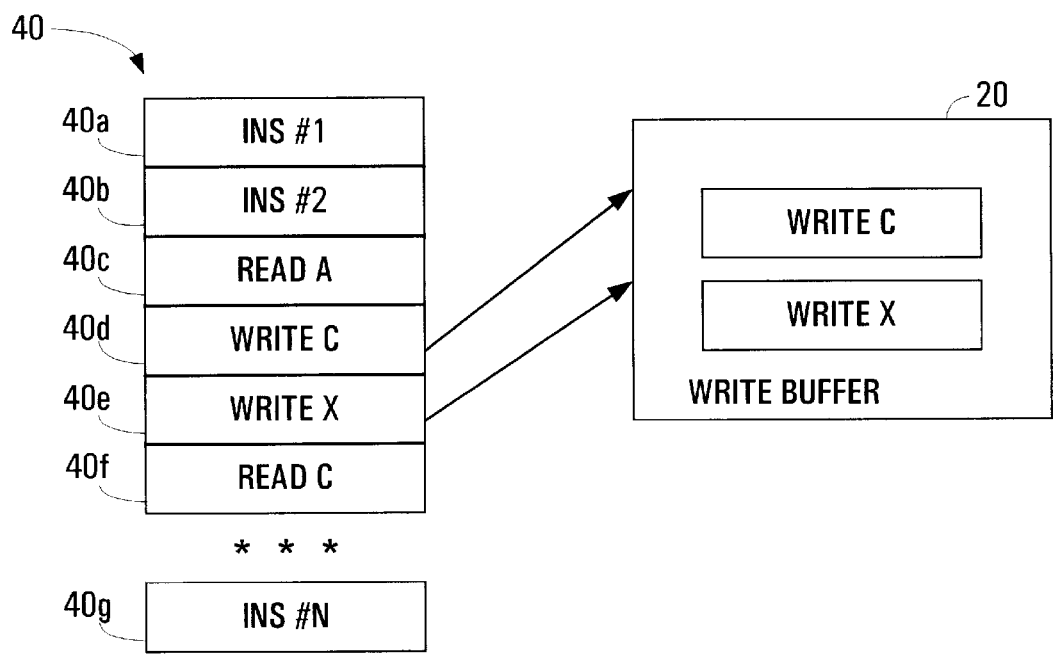
FIG. 1C illustrates a circumstance of write instructions stored in a write buffer where a data dependency exists between a stored write instruction and a subsequently fetched read instruction.

In the following detailed description of the present invention, a method and system for automatically stalling a pipeline of a processor to insure input/output data integrity within a processor that has a write buffer and allows read instructions to bypass pending write instructions, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

COMPUTER SYSTEM 112

Aspects of the present invention, described below, are discussed in terms of steps executed on a computer system (e.g., process 810). Although a variety of different computer systems can be used with the present invention, an exemplary general purpose computer system 112 is shown in FIG. 2.

In general, computer system 112 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 112 also includes a data storage device 104 ("disk subsystem") such as a magnetic or optical disk and disk drive coupled with the bus 100 for storing information and instructions and a display device 105 coupled to the bus 100 for displaying information to the computer user.

Figure 2:
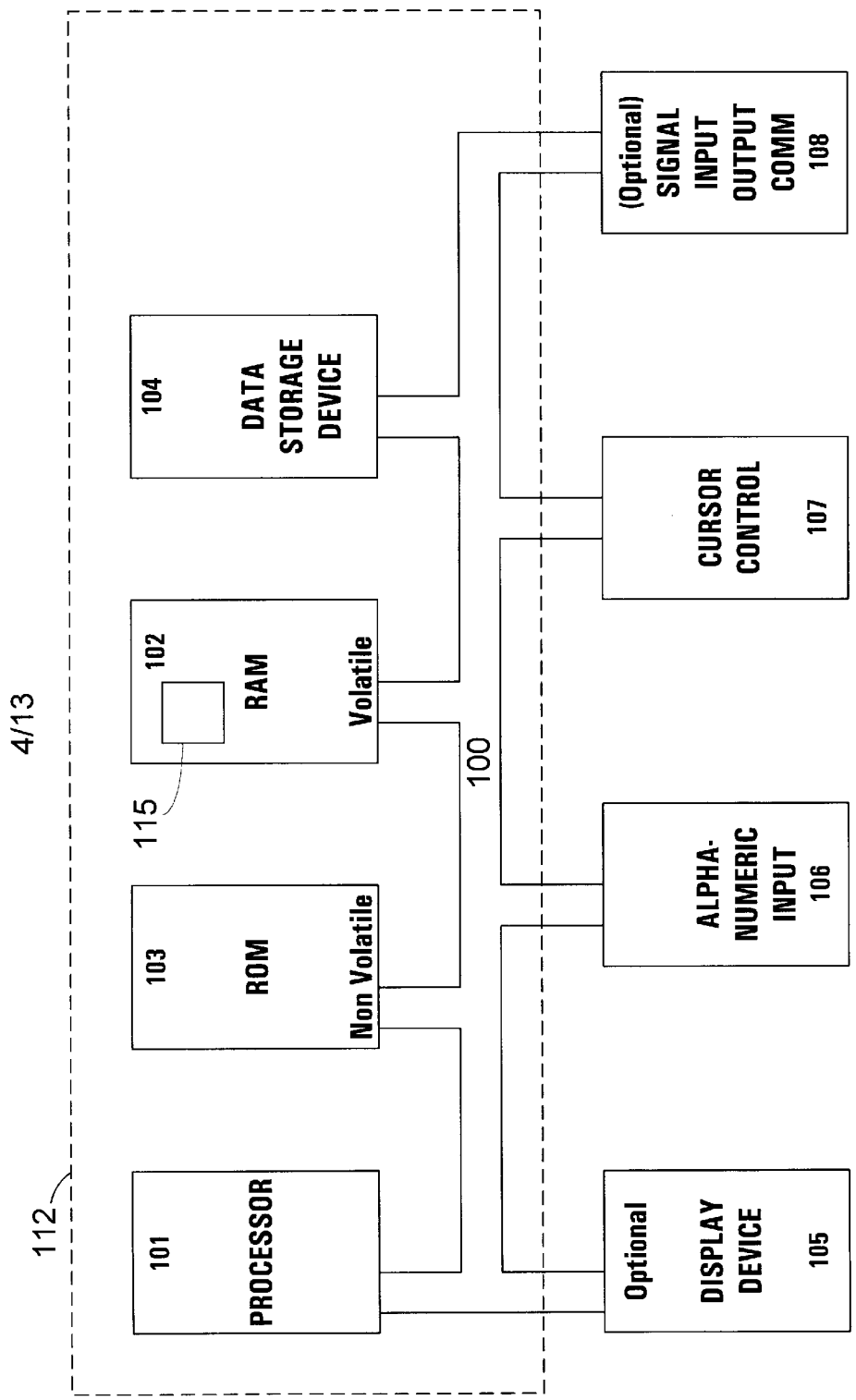
FIG. 2 is a logical block diagram of a general purpose computer system in which an embodiment of the present invention can operate.

Also included in computer system 112 of FIG. 2 is an alphanumeric input device 106 including alphanumeric and function keys coupled to the bus 100 for communicating information and command selections to the central processor 101. System 112 also includes a cursor control or directing device 107 coupled to the bus for communicating user input information and command selections to the central processor 101. Computer system 112 can also include an optional signal generating device 108 coupled to the bus 100 for interfacing with other networked computer systems. The display device 105 utilized with the computer system 112 of the present invention may be a liquid crystal device, other flat panel display, cathode ray tube, or other display device suitable for creating graphic images and alphanumeric characters recognizable to the user. In one embodiment of the present invention, processor 101 is a reduced instruction set (RISC) processor (e.g., R4000). Computer system 112 can operate under an exemplary virtual memory management (VLM) operating system, although the present invention is well suited to operate with a number of operating systems (e.g., Windows operating system, DOS operating system, Macintosh O/S operating system, etc.).

Within computer system 112 of FIG. 2, address ranges that correspond to memory cells within memory units (e.g., ROM 103 and/or RAM 102) are said to be located within the "memory space" of the address space of computer system 112. Address ranges that correspond to peripheral devices (e.g., disk 104, signal device 108, etc.) are said to be located within the "I/O memory space" of the address space of computer system 112. Memory management is performed by the operating system using an address page table 115 (within RAM 102) which contains page frame numbers (PFNs) which maintain physical memory mappings.

As described further below, processor 101 is implemented with a performance enhancing mechanism of the present invention for allowing read instructions to bypass write instructions that are pending in the processor's write buffer under certain circumstances. The read bypassing mechanism of the present invention provides a mechanism for automatically determining when it is safe and not safe for a read instruction of the I/O memory space to bypass pending write instructions of the write buffer. If a read instruction of the I/O memory space is to be processed and there are pending write instructions of the write buffer that also target the I/O memory space, then a pipeline stall automatically occurs until the write buffer is flushed. Otherwise, read bypassing is allowed.

READ BYPASS MECHANISM OF THE PRESENT INVENTION

Figure 3:
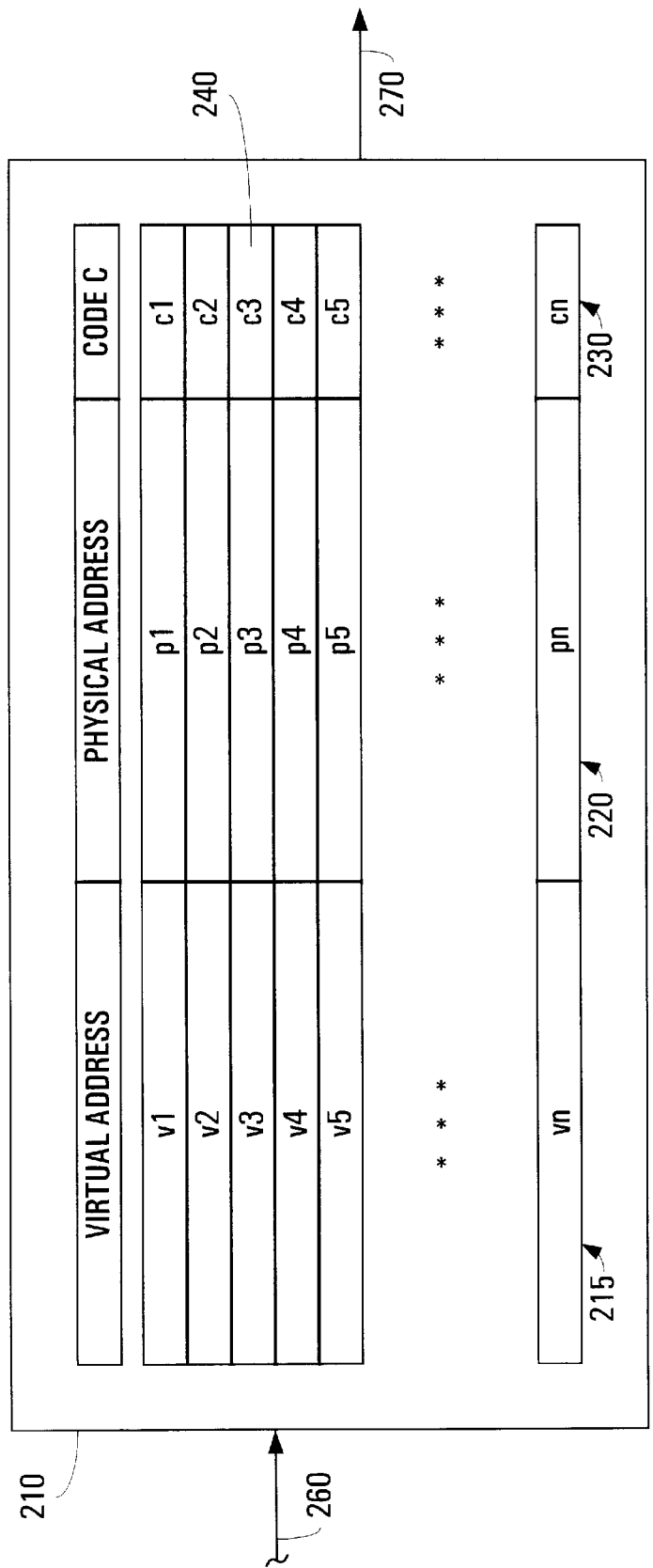
FIG. 3 is an illustration of entries of a translation lookaside buffer (TLB) in accordance with the present invention having a C code attribute for each entry.

The read bypass mechanism of the present invention is now described. FIG. 3 illustrates the contents of a translation lookaside buffer (TLB) 210 used in accordance with the present invention. The TLB 210 is located within the processor 101 of the present invention. The TLB 210 contains n entries, each entry corresponds to a memory location stored within the TLB 210. When full of entries, the least recently used entry of TLB 210 is over-written with new data. The TLB 210 contains a virtual address column 215 for containing virtual addresses (also called virtual page numbers, VPNs), a physical address column 220 for containing physical addresses (also called physical frame numbers, PFNs) and a C code attribute column 230 for containing C code attributes in accordance with the present invention. Virtual address column 215 and physical address column 220 provide a virtual to physical address translation for a memory address associated with a particular entry of the TLB 210.

The C code attribute 230 of the present invention is an attribute that indicates whether or not the associated memory address is within I/O memory space of the address space of computer system 112. This C code attribute 230 is a value within a set of values corresponding to page coherency attributes. As described further below, the C code attribute 230 is initially gathered by the operating system of the computer system 112 (FIG. 8A) and placed within a page frame number (PFN) corresponding to a memory location. When a memory access instruction (read/write) is processed by processor 101, its memory address location is passed through bus 260 into the TLB 210 so that its physical address (PFN) can be looked up, and thereby obtained, from its known virtual address (VPN). The PFN is then supplied over bus 270. If its virtual address is not present within the TLB 210, then a new entry is added within the TLB 210 to accept the virtual address and its physical address (PFN) is obtained from the operating system. Along with the obtained physical address, the operating system also supplies the new TLB entry with a special C code attribute 230 which indicates if the memory location is within I/O memory space or not. The C code attribute 230 is included within the PFN definition.

For instance, refer to entry 240 of FIG. 3 which contains virtual address v3, physical address p3 and C code attribute c3. Upon receiving the virtual address, v3, (over bus 260) corresponding to a memory access instruction to be processed by processor 101, the TLB 210, generates physical address, p3, over bus 270. Also generated over bus 270 is the C code attribute, c3, which indicates whether or not the particular memory address, p3, is within I/O memory space of the address space of computer system 112. If virtual address v3 was not present within TLB 210, then it would be added into a vacant entry of the TLB 210 and the operating system would supply physical address p3. Physical address p3 would then be stored with virtual address v3 in the same entry as v3.

Figure 4:
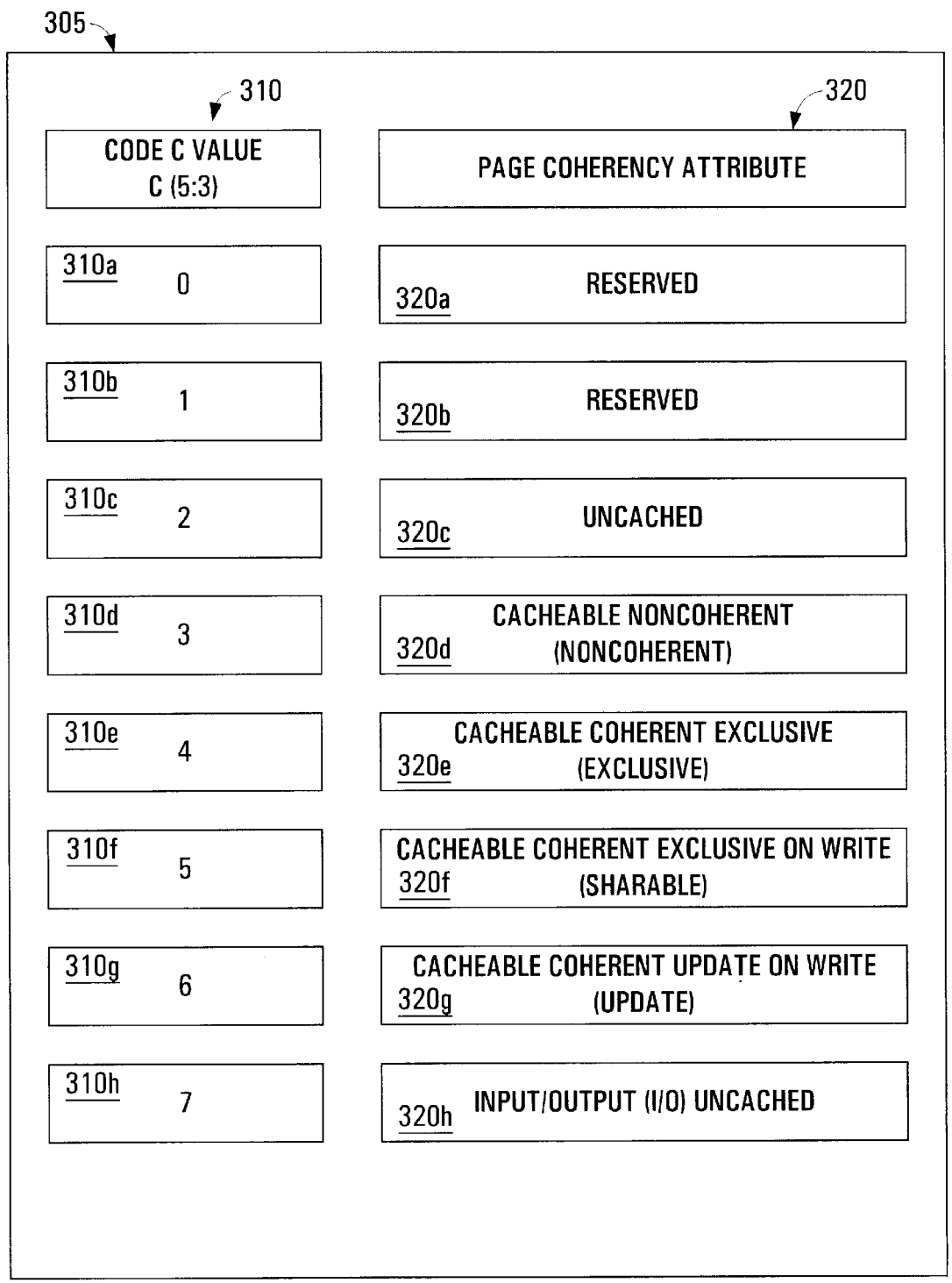
FIG. 4 is a diagram illustrating relevant data within a page coherency attribute of a page frame number (PFN) as used in accordance with the present invention.

FIG. 4 illustrates a break down 305 of the page coherency attributes 320 that are programmed by the operating system of computer system 112. The page coherency attributes 320 are represented by values within the C code attribute 310. The C code attribute 310 is a field of bits located within each PFN and corresponds to the memory location of the PFN. One of these C code attribute values (e.g., 310h) provides an indication as whether the associated memory location is within the I/O memory space of computer system 112. The page coherency attributes 320 are used by the memory management sections of the operating system of computer system 112 and are maintained within the address page table 115 (FIG. 2). In the exemplary implementation of FIG. 4, the C code attribute 310 of the present invention is three bits wide and supports eight different page coherency attributes 320a–320h. It is appreciated that within the scope of the present invention, the C code attribute value can be larger or smaller than 3 bits and 3 bits is only exemplary.

The operating system of the present invention maintains a memory mapping (e.g., within the address page table 115, FIG. 2) within a privileged portion of memory 102 which indicates to which type of memory a particular memory location belongs. This information is maintained within a page frame number (PFN) that is associated with each memory location of the address page table 115 (FIG. 2). The C code attribute bits 310 are located within each PFN for a memory location, as maintained by the operating system. For a given virtual address, the operating system (via the address page table 115) has mapped thereto a particular physical frame number (PFN) which contains the physical address of this virtual memory and also the C code attribute bits 310 corresponding thereto.

More specifically, value "2" 310c of the C code attribute 310 of FIG. 4 represents whether the associated memory is uncached. Value "3" 310d of the C code attribute 310 represents whether the associated memory is cacheable and noncoherent. Value "4" 310e of the C code attribute 310 represents whether the associated memory is cacheable, coherent and exclusive. Value "5" 310f of the C code attribute 310 represents whether the associated memory is cacheable, coherent and exclusive on write. Value "6" 310g of the C code attribute 310 represents whether the associated memory is cacheable, coherent and updated on write. The above memory types are well known.

Within a conventional operating system, values "0–1" 310a–310b and value "7" 310h are typically reserved values. The present invention makes use of one of these reserved values, e.g., value "7" 310h to indicate if the associated memory location points to I/O memory space. It is appreciated that values "0" 310a and "1" 310b could also be used in alternative embodiments of the present invention to indicate whether the associated memory location points to I/O memory space. The particular value, e.g., value "7" within the C code attribute value that indicates if the associated memory location is within the I/O memory space is referred to herein as the "I/O Code."

Figure 5:
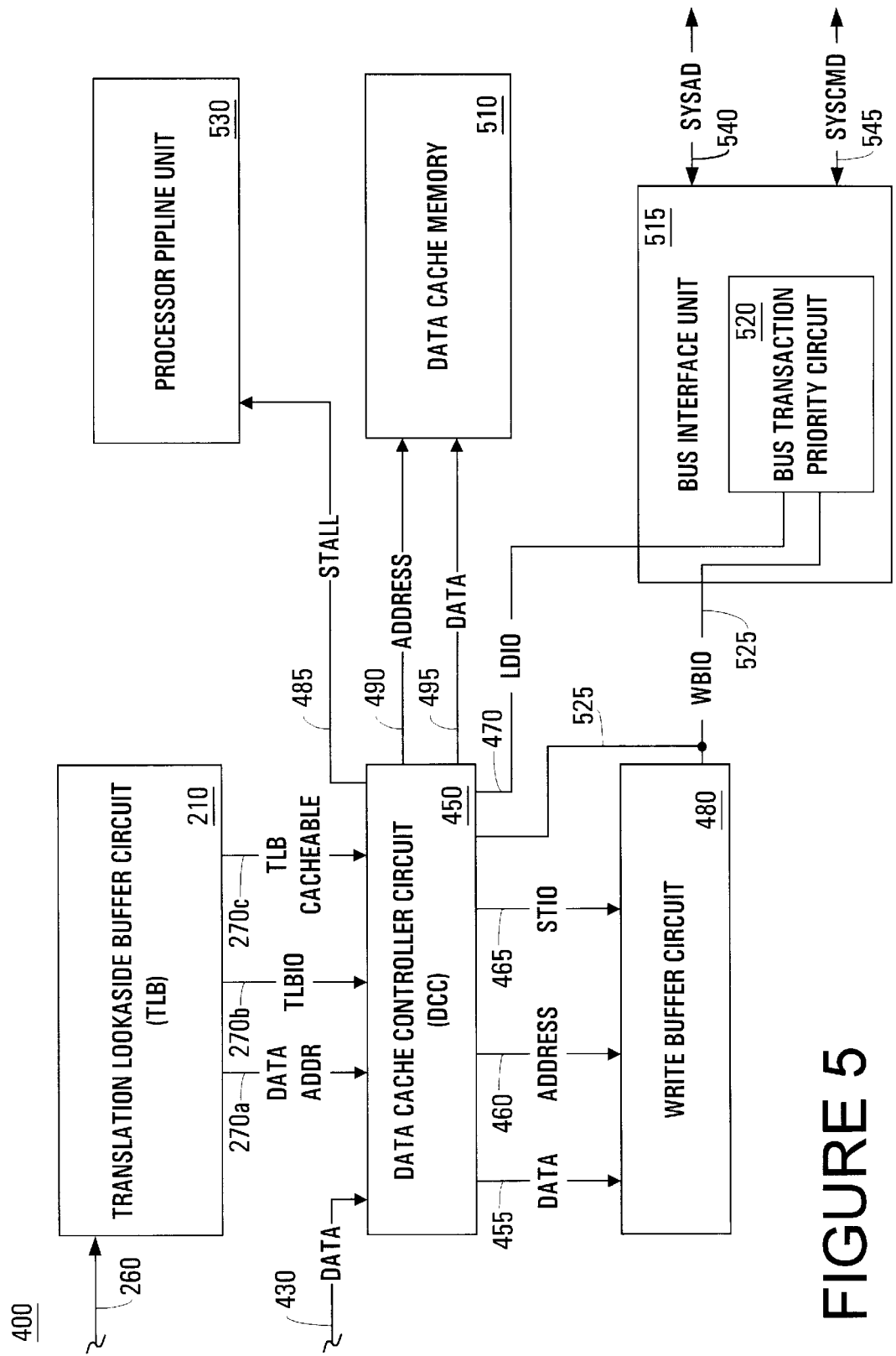
FIG. 5 is a circuit diagram illustrating circuitry utilized by the present invention for determining when a read instruction can bypass write instructions of the write buffer to allow performance gains through out-of-order execution and when a pipeline stall is required to force in-order execution.

FIG. 5 illustrates circuitry 400 of the read bypass mechanism of the present invention. It is appreciated that circuitry 400 is situated within processor 101. In response to a memory access instruction, a particular entry of the n entries of the TLB unit 210 is addressed by bus 260 and information is provided over bus 270a and lines 270b and 270c. Bus 270 contains the physical frame number of the referenced entry of the TLB 210. Bus 270a is coupled to a data cache controller (DCC) circuit 450. Except as described differently herein, any of a number of well known data cache controllers can be used for circuit 450. Line 270b, called the "TLBIO" line contains an indication of whether or not the referenced entry of the TLB 210 points to I/O memory space. This information is directly obtained from the referenced entry of the C code attribute column 230 of TLB 210. Line 270b is coupled to the DCC circuit 450. Line 270c, called the "TLB Cacheable" line contains an indication of whether or not the referenced entry of the TLB 210 is cacheable. Line 270c is also coupled to the DCC circuit 450.

DCC circuit 450 of FIG. 5 receives data associated with a memory access instruction over data bus 430. Bus 270a and lines 270b and 270c are received from TLB 210. The DCC circuit 450 generates a stall signal which is transmitted over line 485 to a processor pipeline unit 530 which executes instructions within processor 101 according to a predetermined pipeline of pipestages. As needed, the stall signal of line 485 causes the pipeline to stall for a determined period of time. The DCC circuit 450 is also coupled via an address bus 490 and a data bus 495 to a data cache memory unit 510. Any of a number of well known data cache memory units can be used as data cache memory circuit 510. Together the DCC circuit 450 and the data cache memory 510 perform well known data cache operations for processor 101.

The DCC circuit 450 is responsible for storing write instructions into the write buffer circuit 480. For this purpose, the DCC circuit 450 generates data values over a data bus 455 which is coupled to the write buffer circuit 480. The DCC circuit 450 also generates physical address values over an address bus 460 which is coupled to the write buffer circuit 480. The DCC circuit 450 also generates an STIO signal over an STIO line 465 that is also coupled to the write buffer circuit 480. The STIO signal indicates whether the current memory instruction processed by the DCC circuit 450 is a write (e.g. "store") instruction that targets the I/O memory space. The physical address information transmitted over bus 460 to the write buffer circuit 480 includes the physical address associated with the memory location of the write instruction. Line 465 (STIO) includes the TLBIO bit associated with the memory location of the write instruction. The DCC circuit 450 also generates an LDIO signal over line 470 to a bus interface unit 515. The LDIO signal indicates whether the current memory instruction processed by the DCC 450 is a read (e.g. "load") instruction that targets the I/O memory space. If a read instruction is being processed that does not target the I/O memory space, then signal LDIO is not asserted. The DCC circuit 450 generates the LDIO signal by examining the TLBIO signal associated with the memory location that is associated with the read instruction.

The write buffer circuit 480 of FIG. 5 contains a number of entries, each entry is for containing information which represents a pending write instruction that has been stored therein for execution. If any of the valid pending write instructions include a memory address that is associated with the I/O memory space, a WBIO signal is applied by the write buffer circuit 480 over line 525 which is coupled to bus interface unit 515.

The WBIO signal of line 525 is also routed back to the DCC 450 to inform the DCC 450 of the activity of the WBIO signal. The DCC 450 uses this information in its determination of whether or not to assert the stall signal of line 485 to the PPU circuit 530.

The bus interface unit 515 of FIG. 5 contains a bus transaction priority circuit 520 which is coupled to receive the LDIO line 470 and also the WBIO line 525. Except to the extent described differently herein, the bus interface unit 515 can be of a number of well known designs within the present invention. The bus interface unit 515 is coupled to an external data and address bus 540. In one embodiment, this is the "SYSAD" bus and corresponds to a portion of the R4000 communication bus. The bus interface unit 515 is also coupled to an external control bus 545. In one embodiment, this is the "SYSCMD" bus and corresponds to a portion of the R4000 communication bus. In one embodiment, the SYSAD bus 540 in combination with the SYSCMD bus 545 constitutes the system bus 100 (FIG. 2) of computer system 112. The SYSAD bus 540 in combination with the SYSCMD bus 545 is coupled to external memory units 102 (FIG. 2) of computer system 112.

When the LDIO line 470 is active and the WBIO line 525 is active, then a read instruction is being processed by the DCC circuit 450 that targets an I/O memory space and also, at the same time, there is at least one pending valid write instruction in the write buffer circuit 480 that also involves the I/O memory space. In this case, the stall line 485 becomes asserted by the DCC circuit 450, the pipeline 530 is stalled, and the bus transaction priority circuit 520 processes the pending write instructions within the write buffer circuit 480 while stalling the read instruction. In this case, transaction priority is given to the write instruction(s) of the write buffer circuit 480. When the LDIO line 470 or the WBIO line 525 is not asserted, or when neither lines are asserted, the bus transaction priority circuit 520 allows a read instruction to bypass any pending write instructions within the write buffer circuit 480. In this case, transaction priority is given to the read instruction and read bypassing is allowed.

When memory access instructions involve I/O memory space, the present invention allows read bypassing in the following conditions. First, when pending write instructions in the write buffer circuit 480 target I/O memory space, but the read instruction does not. Second, when the read instruction targets I/O memory space but there are no valid pending write instructions in the write buffer circuit 480 that target the I/O memory space. The present invention also allows a read bypass when the read instruction does not target I/O memory space.

Figure 6:
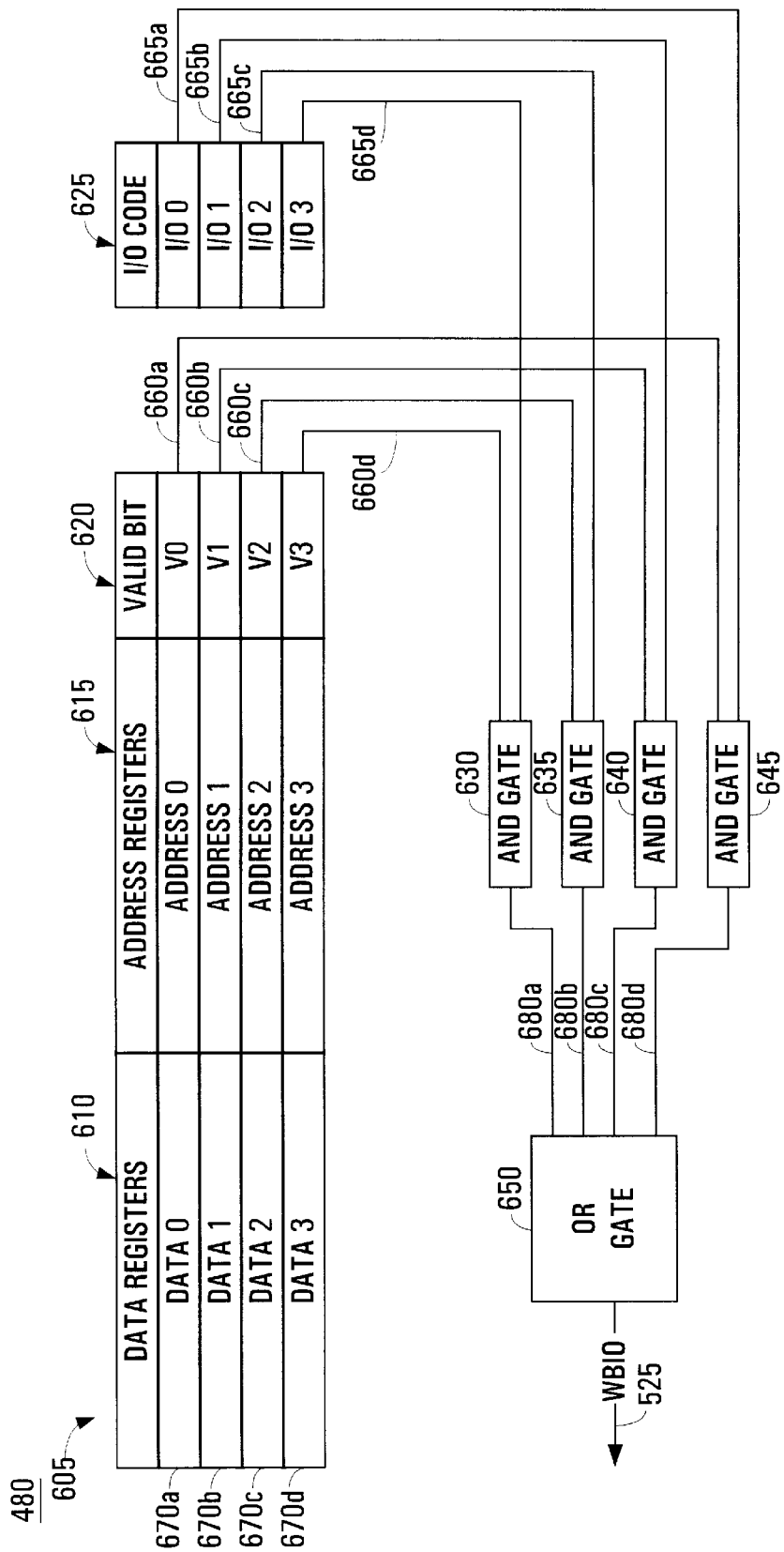
FIG. 6 illustrates circuitry used by the present invention that is situated within the write buffer and which indicates when valid write instructions are stored in the write buffer that involve, e.g., target, input/output (I/O) memory space.

FIG. 6 illustrates circuitry of the write buffer circuit 480 in accordance with the present invention. The write buffer circuit 480 contains a table of registers (table) 605 having four columns of entries. The table 605 can have any number of entries within the present invention. One exemplary implementation is shown in FIG. 6 where the write buffer circuit 480 contains four entries (0–3) labeled 670a–670d. Each entry is for receiving and storing one pending write instruction. The first column 610 contains registers for receiving the data portion of a write instruction. This data is obtained from bus 455 (FIG. 5). The second column 615 of FIG. 6 contains the physical address of the memory location of the write instruction. This data is obtained from bus 460 (FIG. 5). The third column 620 contains a bit which indicates whether or not the write buffer entry contains a valid write instruction. Upon a write instruction being stored in a vacant entry of table 605, the valid bit for that entry is set by the write buffer circuit 480. When a write instruction is fully executed, it is removed from the entry by the write buffer circuit 480 resetting its valid bit. When the valid bit for an entry is reset, the entry is said to be vacant.

The fourth column 625 of FIG. 6 contains the C code attribute "I/O Code" of the present invention which indicates if the memory address of the write instruction (within column 615) targets I/O memory space within the computer system 112. This information is obtained from the STIO line 465 and ultimately this information is transferred from column 230 of the TLB circuit 210 (FIG. 3). In one embodiment, if the associated write instruction for an entry of table 605 points to I/O memory space, then the bit within the I/O code column 625 of the corresponding entry will be set to "1." If the associated write instruction for an entry of table 605 does not point to I/O memory space, then the bit within the I/O code column 625 of the corresponding entry will be set to "0."

The valid bit of column 620 of each entry of table 605 is ANDed, respectively, with each 110 code bit of column 625 by AND gates 630–645 of FIG. 6. For write buffer entry 0, valid bit 0 is transmitted over line 660a and coupled to AND gate 645 and I/O code 0 is transmitted over line 665a to AND gate 645. For entry 1, valid bit 1 is transmitted over line 660b and coupled to AND gate 640 and I/O code 1 is transmitted over line 665b to AND gate 640. For entry 2, valid bit 2 is transmitted over line 660c and coupled to AND gate 635 and I/O code 2 is transmitted over line 665c to AND gate 635. For entry 3, valid bit 3 is transmitted over line 660d and coupled to AND gate 630 and I/O code 3 is transmitted over line 665d to AND gate 630. The output 680a of AND gate 630, the output 680b of AND gate 635, the output 680c of AND gate 640 and the output 680d of AND gate 645 are each coupled to the inputs of OR gate 650. The WBIO signal is generated by the output of OR gate 650 which is coupled to line 525.

In the configuration of FIG. 6, the WBIO signal of line 525 is asserted high whenever one or more valid write instructions are stored in the write buffer table 605 that point to I/O memory space. Otherwise, the WBIO signal of line 525 is not asserted. The value of the WBIO signal changes each time a new write instruction is loaded into table 605 and each time a write instruction is removed from table 605 (e.g., by resetting its valid bit).

Figure 7A:
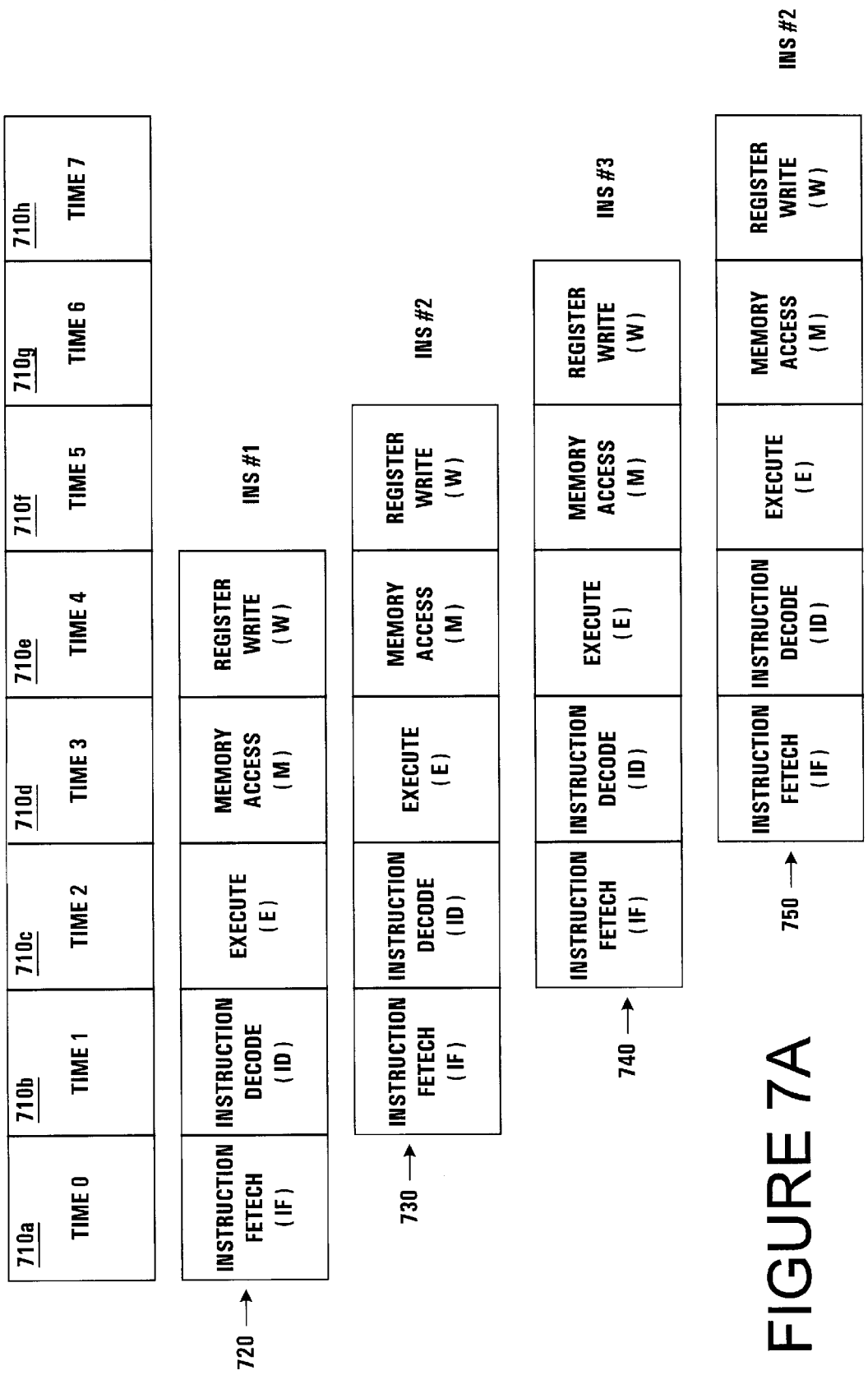
FIG. 7A and FIG. 7B illustrate pipeline processing in accordance with the present invention and further illustrate the outcome of a pipeline stall as generated by the circuitry of FIG. 5.
Figure 7B:
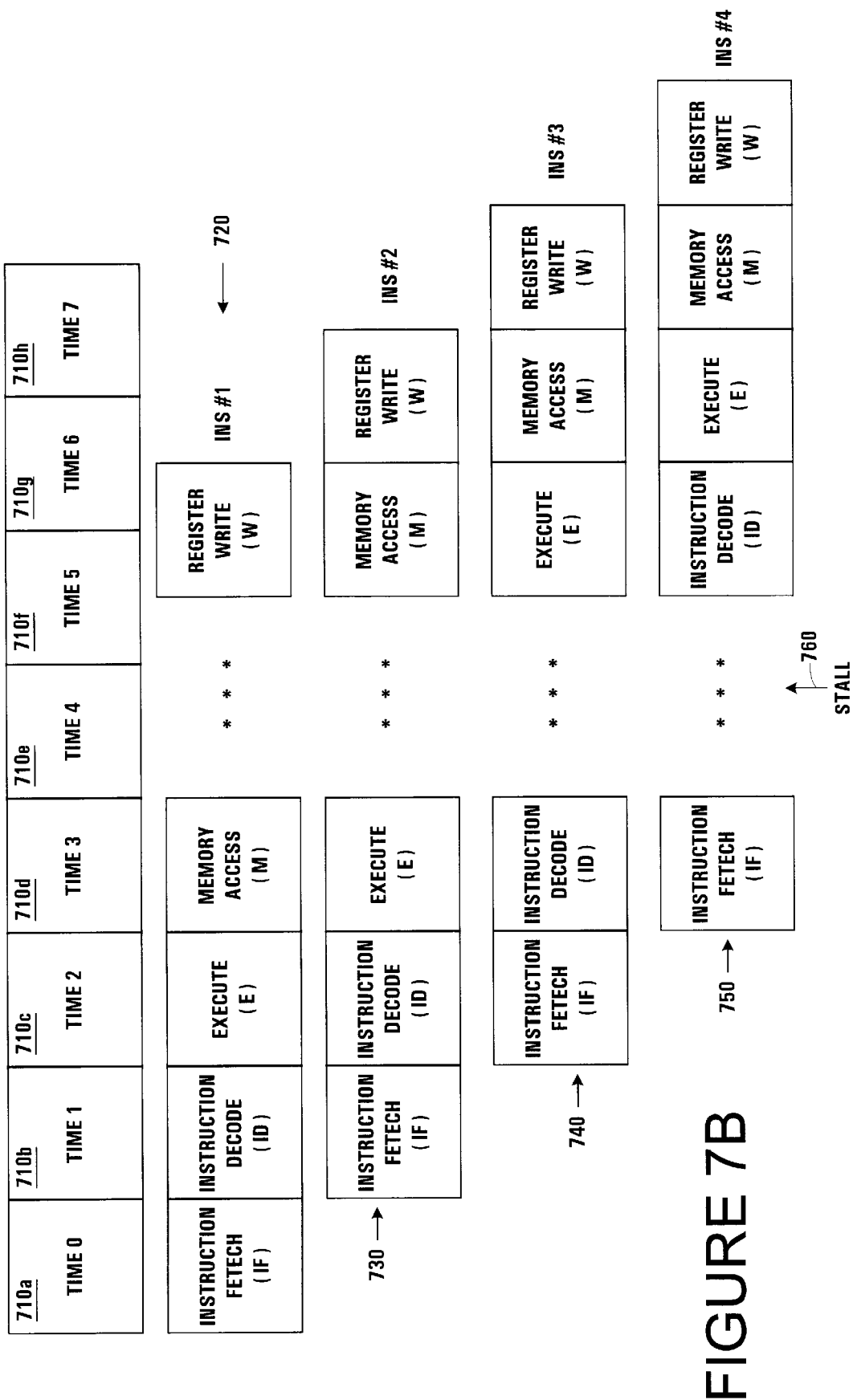

As described with reference to FIG. 5, the stall signal of line 485 is used to stall the pipeline unit 530 in cases where a read bypass is not allowed in accordance with the present invention. FIG. 7A and FIG. 7B describe the operation of the pipeline unit 530 in more detail.

FIG. 7A illustrates the operation of the pipeline circuit 530 of FIG. 5 in diagram format. The pipeline of processor 101 is divided into five exemplary stages. It is appreciated that the pipeline can be made with fewer or more stages consistent with the present invention and the five selected pipestages are exemplary. Further, the respective pipestages shown in FIG. 7A can be divided, individually, into other sub-pipestages. The exemplary pipestages include an instruction fetch (IF) stage, an instruction decode (ID) stage, an execute (E) stage, a memory access (M) stage and a register write (W) stage. Time slots 710a–710h represent sequential clock cycles of processor 101. Pipestages 720 correspond to the processing of a first instruction (instruction #1), pipestages 730 correspond to a second instruction (instruction #2), pipestages 740 correspond to a third instruction (instruction #3) and pipestages 750 correspond to a fourth instruction (instruction #4). In instruction order, instruction #1 is first, followed by instruction #2, followed by instruction #3 which is followed by instruction #4.

As shown in FIG. 7A, in a given clock cycle, the pipeline unit 530 of processor 101 can be performing a number of different pipestages of different instructions simultaneously. For instance, at time3 710d, pipeline unit 530 is performing a memory access (M) of instruction #1, executing (E) instruction #2, decoding (D) instruction #3 and fetching instruction #4. Therefore, within the eight time slots (710a–710h) four instructions can be fully processed by processor 101 using pipelining.

FIG. 7B illustrates the operation of the pipeline unit 530 of the present invention upon a pipeline stall condition. Assume the stall condition is set at time 760, during time period 710e (time4). A stall condition is asserted by the DCC unit 450 when the LDIO signal of line 470 is asserted at the same time as the WBIO signal of line 525. This stall condition 760 is asserted at the start of the memory access (M) pipestage of a read instruction that targets I/O memory space. Assume instruction #2 is that read instruction. The application of the stall signal at 760 causes the memory access (M) pipestage of instruction #2 to stall which delays is processing. The stall signal also delays all other pipestages that are to be performed simultaneously with the memory access (M) pipestage of instruction #2. The stall period (shown as time interval 770) lasts for the time required to flush the write buffer circuit 480 of pending valid write instructions that target the I/O memory space. This interval 770 can represent many clock cycles. When the stall signal of line 470 is de-asserted, the pipeline unit 530 continues where it left of and executes the memory access (M) pipestage of instruction #2, as well as the pipestages of the other instructions that are to be executed simultaneously with this memory access (M) pipestage.

OPERATION OF THE READ BYPASS SYSTEM OF THE PRESENT INVENTION

Figure 8A:
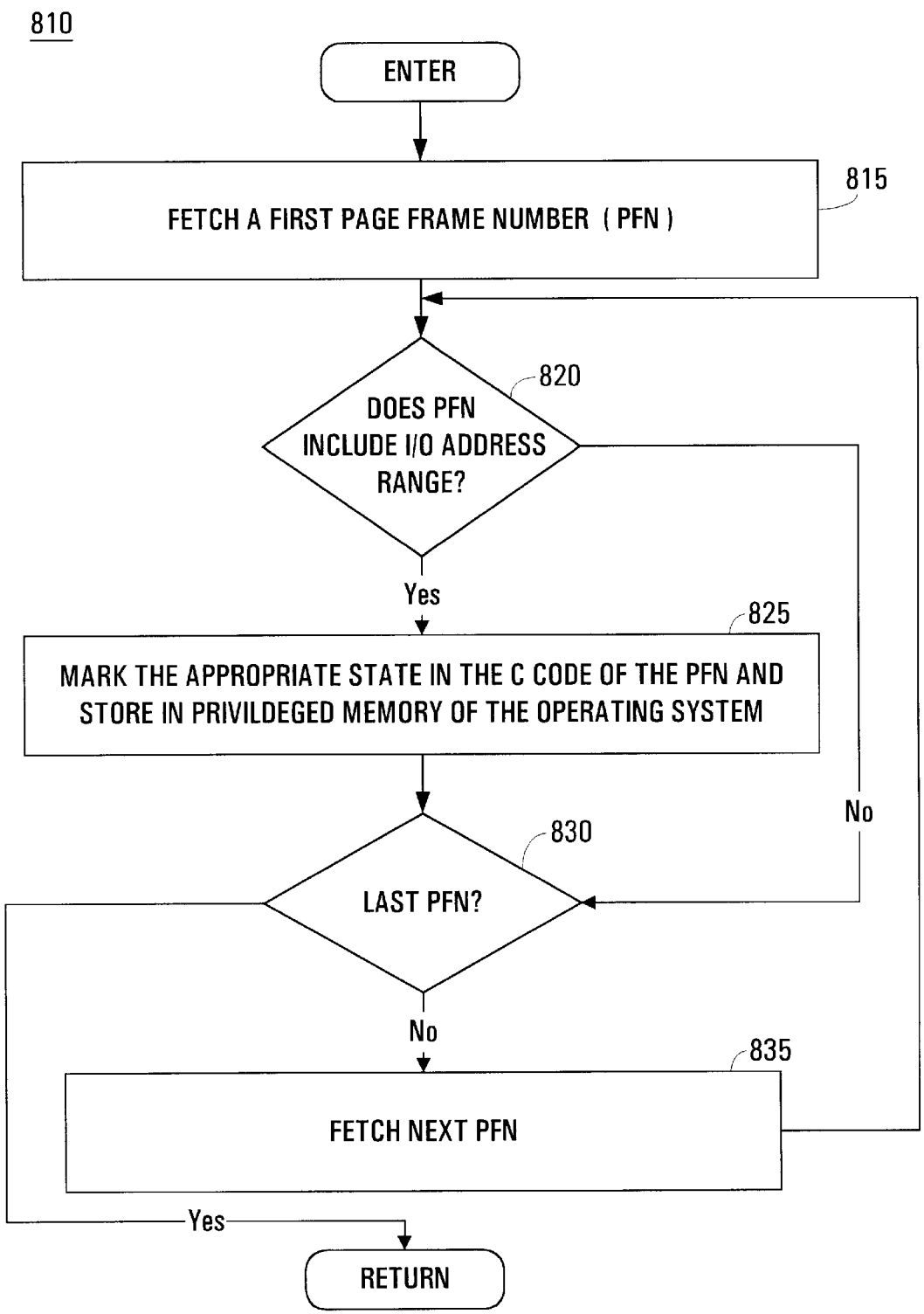
FIG. 8A illustrates steps performed by the operating system of the present invention for coding C code attributes within PFNs that correspond to memory locations that are within I/O memory.

As described above, the read bypass system of the present invention utilizes cooperation between the operating system of computer system 112 and the processor 101 of computer system 112. FIG. 8A is a flow diagram 810 of steps performed by the operating system of the computer system 112 for constructing the page frame number (PFNs) within the address page table 115 so as to include the indication of whether or not respective PFNs point to I/O memory space. Process 810 is performed by the operating system and inserts the C code attribute data of the present invention within the PFNs of memory locations depending on whether or not the memory locations are within I/O memory space. The I/O memory space definitions are typically user-defined and given to the operating system before process 810 executes. It is appreciated that process 810 is implemented as a sequence of instructions stored in computer readable memory units of computer system 112 and executed by processor 101.

At step 815 of FIG. 8A, the operating system fetches a first page frame number (PFN) from the address page table 115. At step 820, the operating system determines if the physical address pointed to by the current PFN is within a predefined I/O memory space. The predefined I/O memory space includes those memory locations that are defined to interface with (e.g., allow communication with) peripheral devices of computer system 112. If the current PFN is not within the I/O memory space, then step 830 is entered. If the current PFN is within the I/O memory space, then the appropriate value state of the C code attribute is set within the page coherency attribute within the selected PFN. This information is then stored in a privileged area of memory 102. In one embodiment, step 825 is implemented by the operating system setting the three bits (5:3) of the C code attribute to a value of "7" as shown in FIG. 4.

At step 830 of FIG. 8A, the operating system checks if the last PFN of the address page table 115 has been processed. If not, then at step 835 the operating system fetches the next PFN of the address page table 115 and returns to step 820. At step 830, if the last PFN has been reached, then process 810 completes. At the completion of process 810, the C code attribute of each PFN is set by the operating system to indicate if the physical address associated with the PFN is within the memory I/O memory space. This information is stored in privileged memory in the address page table 115 within computer system 112.

Figure 8B:
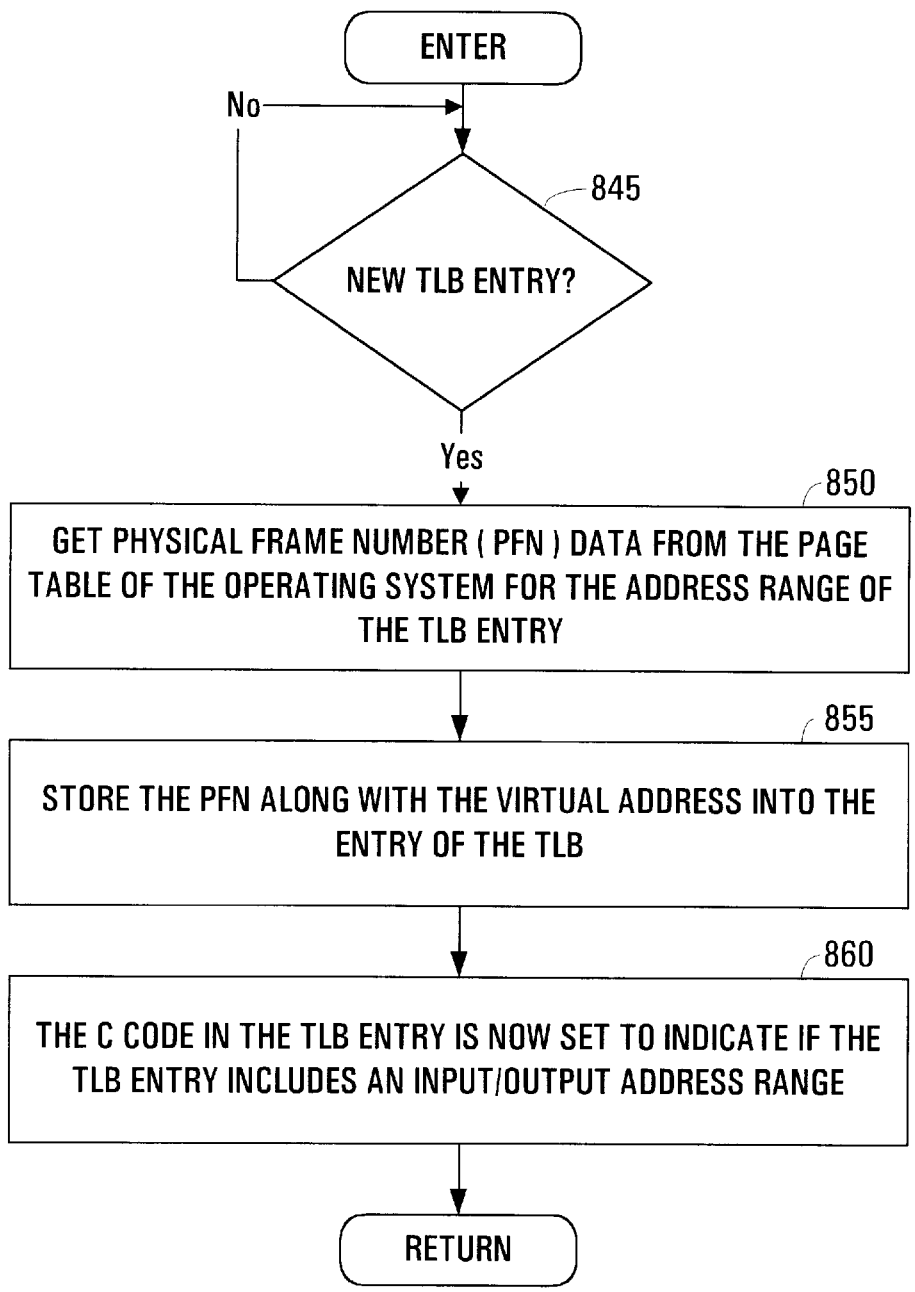
FIG. 8B illustrates steps performed by the present invention upon a new memory address (including VPN, PFN with C code attribute) being added to the TLB.

FIG. 8B illustrates a flow diagram 840 of steps performed by the read bypass circuit 400 of the present invention when a new address is stored in an entry of the TLB circuit 210 (FIG. 3). At step 845, a check is made if a new TLB entry is stored. Upon a new entry being stored in the TLB circuit 210, the physical frame number (PFN) data associated with the virtual address of the new TLB entry is obtained from the address page table 115 of the operating system at step 850. The PFN data supplied by the operating system contains the C code attribute data of the present invention which includes an indication 310h (FIG. 4) of whether or not the physical address points to I/O memory space. At step 855, the physical address of the PFN data is stored in the new TLB entry (in column 215) as well as the virtual address corresponding to the PFN (in column 220). The C code attribute data is also stored in this entry (in column 230) at step 855. At step 860, the C code in the TLB entry is now set to indicate if the TLB entry includes an address within the I/O memory space. If the TLB entry does not include an address within the I/O memory space, then the C code attribute is not set.

It is appreciated that when a write instruction is encountered by the DCC circuit 450 (FIG. 5), the DCC circuit 450 checks the write buffer circuit 480 to determine if there is a vacant entry therein. If so, the DCC circuit 450 writes the write instruction into a vacant entry and sets the valid bit of this entry. The physical address of the write instruction is obtained from the TLB entry corresponding to the memory location of the write instruction and this physical address is written into the write buffer circuit 480. During the above operation, the C code attribute associated with the memory location is also written by the DCC circuit 450 into the write buffer circuit 480. The data associated with the write instruction is also written by the DCC circuit 450 into the write buffer circuit 480. After a write instruction is written into the write buffer circuit 480, the WBIO signal is updated by the circuitry of FIG. 6.

Figure 9:
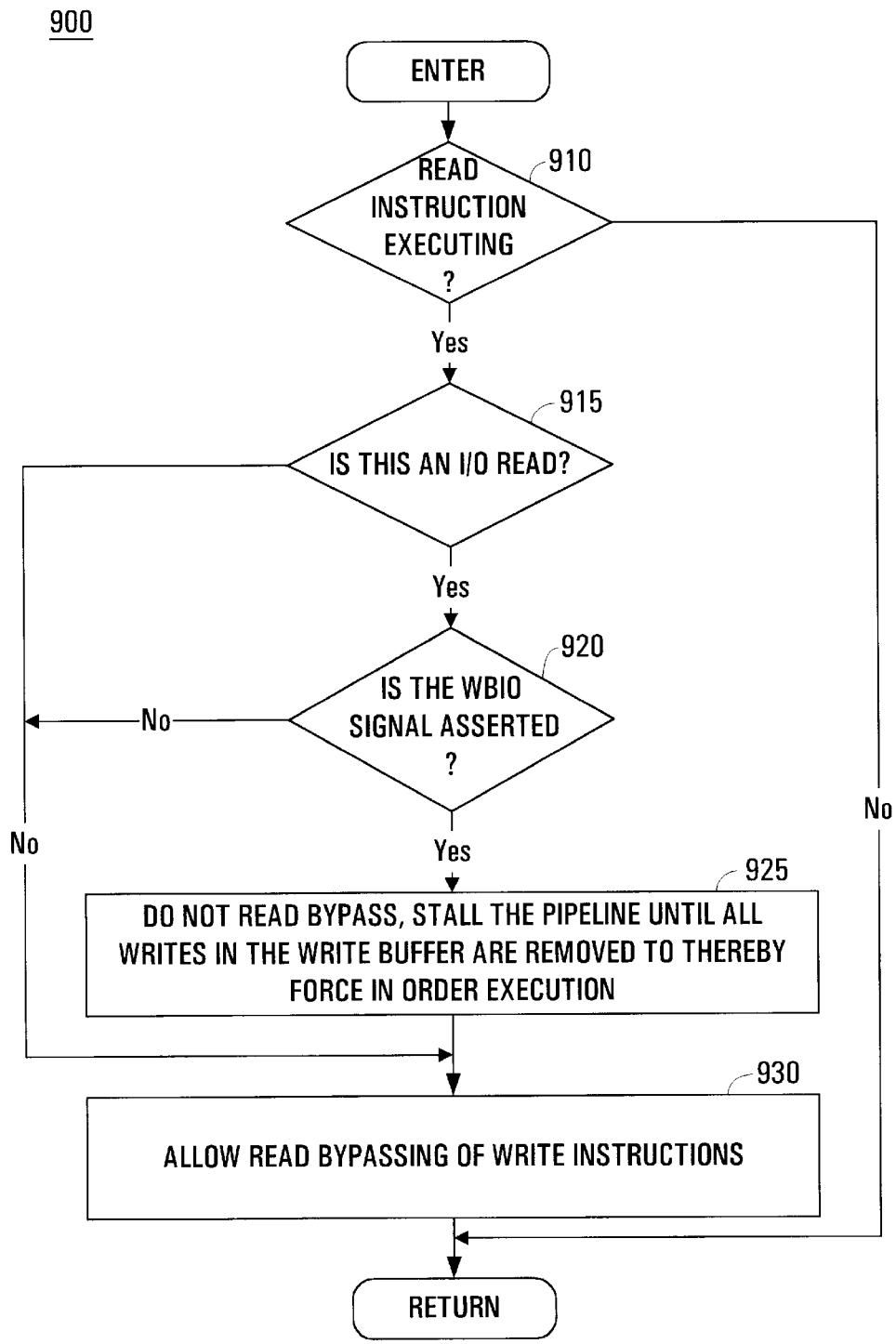
FIG. 9 illustrates steps performed by the present invention each time a read instruction is presented to the bus interface unit of the processor to determine if read bypassing is allowed or if a pipeline stall is required.

FIG. 9 illustrates a flow diagram 900 of steps performed by the read bypass circuit 400 of the present invention upon a read instruction being presented to the bus interface unit 515 (FIG. 5) for its memory access transaction. At step 910, if a read instruction is encountered by the bus interface unit 515, then step 915 is entered, otherwise process 900 returns. At step 915, if the read instruction includes a memory location that targets the I/O memory space, then step 920 is entered. Otherwise, step 930 is entered. At step 930, the bus interface unit 515 allows the read instruction to bypass any write instructions (that target I/O memory space) that may or may not be located in the write buffer circuit 480. The read instruction is allowed to bypass because no I/O data dependencies can exist between the instructions of the write buffer circuit 480 because the read instruction does not target I/O memory space. In this circumstance, the read instruction is given priority by the bus transaction priority circuit 520 of the bus interface unit 515 of FIG. 5.

At step 920 of FIG. 9, the LDIO signal of line 470 is asserted high because a read instruction that uses I/O memory space is encountered by the bus interface unit 515. At step 920, if the WBIO signal of line 525 is asserted, then step 925 is entered, otherwise step 930 is entered. If step 930 is entered from step 920, then a read instruction that targets I/O memory space is encountered, but there is no write instruction that targets I/O memory space within the write buffer circuit 480. In this case, no I/O memory space data dependencies can exist between the instructions and the bus interface unit 515 allows the read instruction to bypass any write instructions located in the write buffer. In this circumstance the read instruction is given priority by the bus transaction priority circuit 520 of the bus interface unit 515.

At step 925 of FIG. 9, the encountered read instruction targets I/O memory space and there is at least one valid write instruction in the write buffer circuit 480 that involves I/O memory space. At this point, there could also be more than one valid write instruction in the write buffer circuit 480 that targets I/O memory space. In order to maintain data integrity in the peripheral devices, the stall signal of line 485 is asserted by the DCC unit 450. The stall signal causes the pipeline unit 530 to stall (FIG. 7B) while write instructions of the write buffer circuit 480 are given priority over the read instruction by the bus interface unit 515. This continues until there are no valid write instructions left in the write buffer circuit 480 that target I/O memory space. In this case, the read instruction is not allowed by the bus interface unit 515 to bypass any write instructions and the in-order sequence of the instructions is forced by the processor 101. After all the valid write instructions that target I/O memory space are removed from the write buffer circuit 480, signal WBIO is deasserted and step 925 terminates (the stall signal is then deasserted). After step 925, the pipeline unit 530 is allowed to continue processing at the memory access (M) pipestage of the stalled read instruction (e.g., the bus interface unit 515 continues to process the previously stalled read instruction). Process 900 then terminates.

As described above, the present invention provides a mechanism and method for interfacing with an operating system to determine conditions when I/O memory space data dependencies exist between read and write instructions. The present invention does not require a special user inserted command to perform the above determination but performs the determination automatically and without the additional processing cycles required of a special user command. Further, performance enhancing read bypassing is allowed for the many instances when (1) a read instruction does not target the I/O memory space or (2) when a read instruction does target the I/O memory space but no valid write instructions are stored in the write buffer circuit 480 that target I/O memory spaces.

The preferred embodiment of the present invention, a method and system for automatically stalling a pipeline of a processor to insure input/output data integrity within a processor that has a write buffer and allows read instructions to bypass pending write instructions, is thus described. While the present invention has been described in particular embodiments, it should be appreciated that the present invention should not be construed as limited by such embodiments, but rather construed according to the below claims.

What is claimed is:

1. In a processor, a circuit comprising:

a translation lookaside buffer (TLB) storing virtual and physical addresses and attribute values indicating any physical addresses that map to an input/output (I/O) memory space;

a data cache controller coupled to said TLB for generating a first signal indicating a read instruction that accesses said I/O memory space;

a write buffer circuit having a plurality of entries each for storing an indication of an associated write instruction and an attribute value indicating if said associated write instruction accesses said I/O memory space, said write buffer circuit for generating a second signal if one write instruction stored therein accesses said I/O memory space; and a bus interface unit prohibiting said read instruction from bypassing a write instruction of said write buffer circuit if said first and second signals are asserted and wherein said bus interface unit allows said read instruction to bypass any write instruction of said write buffer circuit provided said first and second signals are not both asserted.

2. A circuit as described in claim 1 further comprising a pipeline unit and wherein said data cache controller generates a stall signal when said first signal and said second signal are both asserted and wherein said stall signal is for stalling said pipeline unit.

3. A circuit as described in claim 2 wherein said bus interface unit is also for flushing any write instructions out of said write buffer circuit when said stall signal is generated.

4. A circuit as described in claim 1 wherein attribute values of said entries of said TLB are determined by an operating system of a computer system, said processor being included within said computer system.

5. A circuit as described in claim 4 wherein said operating system stores said attribute values in physical frame numbers that are collected in an address page table of a memory unit.

6. A circuit as described in claim 1 wherein said write buffer circuit comprises a logic gate for receiving each attribute value of each entry of said write buffer circuit, wherein said logic gate is for generating said second signal if any of said attribute values indicate a stored write instruction that targets said I/O memory space.

7. A circuit as described in claim 1 further comprising an external memory unit coupled to an external bus, said external bus coupled to said bus interface unit and wherein said processor is a reduced instruction set computer (RISC) microprocessor.

8. In a processor, a circuit comprising:

first buffer means for storing virtual and physical addresses and attribute values indicating any physical addresses that map to an input/output (I/O) memory space;

controller means, coupled to said first buffer means, for generating a first signal indicating a read instruction that accesses said I/O memory space;

second buffer means having a plurality of entries each for storing an indication of an associated write instruction and an attribute value indicating if said associated write instruction accesses said I/O memory space, said second buffer means for generating a second signal if one write instruction stored therein accesses said I/O memory space; and bus access means for prohibiting said read instruction from bypassing a write instruction of said second buffer means when said first and second signals are asserted and wherein said bus interface means is also for allowing said read instruction to bypass any write instruction of said second buffer means provided said first and second signals are not both asserted.

9. A circuit as described in claim 8 further comprising pipeline means for executing instructions and wherein said controller means is also for generating a stall signal when said first signal and said second signal are both asserted and wherein said stall signal is for stalling said pipeline means.

10. A circuit as described in claim 8 wherein attribute values of said entries of said first buffer means are determined by an operating system of a computer system, said processor being included within said computer system and wherein said operating system stores said attribute values in physical frame numbers that are collected in an address page table of a memory unit.

11. A computer system having a processor coupled to a bus, a memory coupled to said bus and an operating system, said processor having a circuit for detecting data dependencies between memory access instructions comprising:

a translation lookaside buffer (TLB) circuit having entries storing virtual and physical addresses and attribute values indicating any physical addresses that map to an input/output (I/O) memory space;

a data cache controller coupled to said TLB for storing write instructions into a write buffer circuit and for generating a first signal indicating a read instruction that accesses said I/O memory space;

said write buffer circuit having a plurality of entries each for storing an indication of an associated write instruction and an attribute value indicating if said associated write instruction accesses said I/O memory space, said write buffer circuit for generating a second signal if one write instruction stored therein accesses said I/O memory space; and a bus interface unit prohibiting said read instruction from bypassing a write instruction of said write buffer circuit if said first and second signals are asserted and wherein said bus interface unit allows said read instruction to bypass any write instruction of said write buffer circuit provided said first and second signals are not both asserted.

12. A computer system as described in claim 11 wherein said processor further comprises a pipeline unit and wherein said data cache controller circuit generates a stall signal when said first signal and said second signal are asserted, said stall signal for stalling said pipeline unit.

13. A computer system as described in claim 12 wherein said bus interface unit is also for flushing any write instructions of said write buffer circuit when said stall signal is generated.

14. A computer system as described in claim 11 wherein said operating system is for determining said attribute values of said entries of said TLB circuit.

15. A computer system as described in claim 14 wherein said operating system is also for storing said attribute values into physical frame numbers that are collected within an address page table that resides within said memory.

16. A computer system as described in claim 11 wherein said write buffer circuit comprises a logic gate for receiving each attribute value of each entry of said write buffer circuit, wherein said logic gate is for generating said second signal if any of said attribute values indicate a stored write instruction that targets said I/O memory space.

17. A computer system as described in claim 11 wherein said processor is a reduced instruction set computer (RISC) microprocessor.

18. In a computer system having a processor coupled to a bus, a memory coupled to said bus and an operating system, a method of detecting data dependencies in memory access instructions comprising the steps of:
 a) storing information within entries of a translation lookaside buffer circuit, said entries containing virtual and physical addresses and attribute values indicating physical address within an input/output memory space;
 b) storing write instructions into a write buffer circuit including storing an attribute value corresponding to a physical address of a write instruction;
 c) generating a first signal upon a read instruction that reads from said input/output memory space;
 d) generating a second signal if one write instruction stored in said write buffer circuit writes to said input/output memory space;
 e) prohibiting said read instruction from bypassing a write instruction of said write buffer circuit if said first and second signals are asserted; and
 f) allowing said read instruction to bypass any write instruction of said write buffer provided said first and second signals are not both asserted.

19. A method as described in claim 18 further comprising the step of g) generating an attribute value for each page frame number associated with said computer system and storing respective attribute values into respective page frame numbers wherein an attribute value is generated based on whether or not a respective page frame number is within said input/output memory space.

20. A method as described in claim 19 wherein said step g) is performed by said operating system and wherein said page frame numbers are stored within an address page table of said memory.

21. A method as described in claim 19 wherein step e) comprises the steps of:
 e1) preventing said read instruction from bypassing any write instructions of said write buffer;
 e2) stalling a pipeline of said processor; and
 e3) processing write instructions through a bus interface unit to flush out said write buffer circuit.

22. A method as described in claim 19 wherein said step c) is performed by a data cache controller circuit of said processor and wherein said step d) is performed by said write buffer circuit.

* * * * *